2,925,401

POLYETHYLENE COMPOSITIONS CONTAINING 2,4,4'-TRIHYDROXYBENZOPHENONE

Gordon C. Newland, John W. Tamblyn, and Charles J. Kibler, Kingsport, Tenn., assignors to Eastman Kodak Company, Rochester, N.Y., a corporation of New Jersey No Drawing. Application January 17, 1958
Serial No. 709,460

3 Claims. (Cl. 260—45.95)

This invention relates to the stabilization of polyethylene compositions, and more particularly, to the stabilization of polyethylene composition against deterioration resulting from exposure to sunlight or ultraviolet light.

Polyethylene is subject to deterioration when exposed to ultraviolet light. A number of so-called ultraviolet inhibitors are known which are used to inhibit the deterioration or degradation of many plastic or resin materials. However, some of the most effective of these known ultraviolet inhibitors for such plastic materials as cellulose acetate, polystyrene, polyvinyl chloride and the like are not compatible with polyethylene. Typical of such ultraviolet inhibitors are 2,4-dihydroxybenzophenone and 2,2',4,4'-tetrahydroxybenzophenone. Also, there are other common ultraviolet inhibitors that are compatible with, but are not entirely satisfactory stabilizers for, polyethylene. In addition, many effective stabilizers for halogen-containing polymers such as polyvinyl chloride, polyvinylidene chloride, and the like are not necessarily effective stabilizers in polyethylene as stabilizers in halogen-containing polymers function essentially as halide scavengers while stabilizers in polyethylene do not serve this function. Hence, it is highly unpredictable as to whether a given stabilizer or ultraviolet inhibitor will be compatible with, and a good stabilizer for, polyethylene compositions short of actually testing the material in polyethylene.

It is an object of this invention to provide new polyethylene compositions of high stability against deterioration resulting from exposure to sunlight or ultraviolet light.

It is a further object of this invention to provide novel polyethylene compositions containing an additive that is compatible with, and an effective ultraviolet inhibitor for, the polyethylene compositions.

It is likewise an object of this invention to provide novel polyethylene compositions containing a hydroxybenzophenone ultraviolet inhibitor that will not exude therefrom.

Other objects of the invention will be apparent from the description and claims which follow.

The present invention comprises polyethylene compositions of improved resistance to deterioration due to ultraviolet light having incorporated therein a stabilizing amount of 2,4,4'-trihydroxybenzophenone which has the following structural formula:

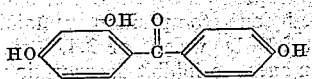

The subject ultraviolet inhibitor can be used to stabilize a wide variety of ethylene polymer compositions including both "low-density" and "high-density" polyethylene. Conventional polyethylene, "low-density" polyethylene, usually has a density of about 0.91 to 0.93 and can be prepared by several methods including the method disclosed for Fawcett et al. in U.S. Patent 2,153,553. "High-density" polyethylene usually has a density of about 0.94 to 0.97 and can be prepared by such methods as are disclosed in co-pending applications of Coover, U.S. Serial No. 559,536 which was filed January 17, 1956, and U.S. Serial No. 613,609 which was filed October 3, 1956. The subject stabilizer can be used as ultraviolet inhibitors for conventional polyethylene compositions as well as the so-called polyethylene waxes. The subject inhibitor is of particular utility in thin films or sheets of polyethylene compositions.

The amount of 2,4,4'-trihydroxybenzophenone employed in polyethylene compositions can be widely varied, the stabilizing amount varying with the particular use to which the polyethylene composition is to be put. Concentrations of 2,4,4'-trihydroxybenzophenone of 0.1% to 10% are more generally used and concentrations of 0.5% to 5% are preferably employed, the concentrations being based on the weight of the polyethylene composition.

The ultraviolet inhibitor of the invention can be incorporated or blended in polyethylene compositions by any of the conventional methods used for blending such materials into resins or plastics. Typical of such methods that can be suitably employed include milling on heated rolls, deposition from solvents and dry-blending.

The ultraviolet inhibitor of the present invention, 2,4,4'-trihydroxybenzophenone, lends to polyethylene compositions improved stability, and more specifically improved stability against deterioration resulting from exposure to sunlight or ultraviolet light. Also, the subject inhibitor does not impart objectionable discoloration to polyethylene. Thus, polyethylene compositions stabilized in accordance with the invention can be utilized for a wide diversity of applications. The polyethylene stabilizer of the invention, apart from being an effective stabilizer against deterioration resulting from exposure to ultraviolet light, has unexpected compatibility with polyethylene compositions. For example, while the subject 2,4,4'-trihydroxybenzophenone has good compatibility with polyethylene compositions, such closely related compounds as 2,4-dihydroxybenzophenone and 2,2',4,4'-tetrahydroxybenzophenone are not compatible with polyethylene compositions. The former exudes from polyethylene after being compounded therein while the latter is insoluble in polyethylene.

The effectiveness of 2,4,4'-trihydroxybenzophenone as a stabilizer against photodegradation or ultraviolet light deterioration in polyethylene is illustrated by the following examples of typical polyethylene stabilizer tests.

EXAMPLE 1

Into polyethylene having a molecular weight of about 30,000 and a density of 0.945 was hot-roll-compounded 1% by weight of 2,4,4'-trihydroxybenzophenone. The resulting composition was thereafter compression-molded into sheets about 1/16 inch thick. Ten samples, 1½ by ½ inches were diced out of the compression-molded sheets, bent into a U-shape and exposed to outdoor weathering at Kingsport, Tennessee. The stressed portion of each sample was mounted facing south. Ten additional samples were prepared containing no stabilizer and were also subjected to the weathering test for comparative purposes. The exposure times in days required to crack the first sample, half the samples (five samples), and all (ten) samples are recorded below in Table 1 for both the samples containing 2,4,4'-trihydroxybenzophenone and the samples containing no stabilizer.

Table 1

| Stabilizer | Stress-Cracking Resistance Exposure Times in Days Required to Crack | | |
|---|---|---|---|
| | 1 Sample | 5 Samples | 10 Samples |
| none | 160 | 170 | 330 |
| 2,4,4'-Trihydroxybenzophenone | 390 | 400 | 450 |

As can be observed from the data in Table 1, 2,4,4'-trihydroxybenzophenone is an effective stabilizer in polyethylene against deterioration resulting from exposure to sunlight. The 2,4,4'-trihydroxybenzophenone additive was compatible with the polyethylene samples and did not exude therefrom during the course of the weathering test.

EXAMPLE 2

Into polyethylene having a molecular weight of about 27,600 and a density of 0.919 was hot-roll-compounded 1% by weight of 2,4,4'-trihydroxybenzophenone. The resulting composition was thereafter compression-molded into sheets ⅛ inch thick. Ten samples of the resulting sheets were prepared and subjected to the outdoor weathering test as described in Example 1. Ten samples containing no stabilizer were also included in the weathering test. In Table 2 below is recorded the number of days' exposure required to produce cracks in half of the samples (five samples).

Table 2

| Stabilizer | Stress-Cracking Resistance Exposure Time in Days Required to Crack Half the Samples |
|---|---|
| none | 170 |
| 2,4,4'-Trihydroxybenzophenone | 392 |

None of the 2,4,4'-dihydroxybenzophenone exuded from the polyethylene samples during the course of the weathering test.

EXAMPLE 3

Into polyethylene having a molecular weight of about 27,600 and a density of 0.919 was hot-roll-compounded 1% by weight of 2,4,4'-trihydroxybenzophenone. The resulting composition was thereafter compression-molded into sheets 60 mils thick. Samples of the resulting sheets and a control sample containing no additive were exposed to outdoor weathering on a rack facing south at an angle with the horizontal of 36.5° at Kingsport, Tennessee. After 14½ months exposure, the samples were tested for deterioration by elongation measurements on an Instron tensile tester at a rate of stretch of 100% per minute. The results of the test are summarized by the data in Table 3 below.

Table 3

| Stabilizer | Percent original Elongation Retained After 14½ Months Exposure |
|---|---|
| none | 10 |
| 2,4,4'-trihydroxybenzophenone | 30 |

None of the 2,4,4'-trihydroxybenzophenone exuded from the polyethylene during the course of the weathering and elongation tests.

EXAMPLE 4

The subject stabilizer, 2,4,4'-trihydroxybenzophenone, has good compatibility with polyethylene, which compatibility many closely related compounds do not possess. Several stabilizers at a level of 1% by weight were incorporated in polyethylene by milling on heated rolls, compression-molded into 60 mil sheets of polyethylene, and exposed to outdoor weathering as described in Example 3. After 14½ months of weathering, the surfaces of the respective samples were examined for possible exudation of the stabilizer additive. Table 4 below summarizes the results of the compatibility test of several hydroxybenzophenones in the polyethylene samples.

Table 4

| Stabilizer | Amount of Exuded Stabilizer Additive |
|---|---|
| none | none. |
| 2,4,4'-Trihydroxybenzophenone | none. |
| 2,4-Dihydroxybenzophenone | much. |
| 2,2'-Dihydroxy-4-4'-dimethoxybenzophenone | much. |
| 2,4-Dihydroxy-5-hexylbenzophenone | much. |
| 2-Hydroxy-4,4'-dimethoxybenzophenone | much. |

The hydroxybenzophenone, 2,2'4,4'-tetrahydroxybenzophenone, was found to be insoluble in the polyethylene at a 1% level and could not be incorporated therein. As can be observed from the information set out in Table 4, 2,4,4'-trihydroxybenzophenone has good compatibility in polyethylene, which compatibility other closely related hydroxybenzophenones do not possess.

The 2,4,4'-trihydroxybenzophenone stabilizer of the invention can be prepared by the method described in Example 5 below.

EXAMPLE 5

A mixture of 55.2 g. (0.4 moles) of p-hydroxybenzoic acid, 22.0 g. (0.2 mole) of resorcinol and 200 ml. of tetrachloroethane was placed in a 500 ml. flask equipped with a stirrer, a gas inlet tube, and an air condenser. Boron trifluoride gas was introduced into the flask with constant stirring until 20.0 g. had been absorbed, 3 hours being required. The resulting mixture was then heated with stirring on a steam bath for 4 hours. The reaction mixture was thereafter cooled to room temperature and added to a solution of 55 g. of sodium acetate in 300 ml. of water. The resulting yellow crystalline solid was filtered, dissolved in 10% sodium hydroxide, reprecipitated with dilute hydrochloric acid, filtered, washed with dilute sodium bicarbonate solution, and then recrystallized from a 1:1 methanol-water solution. We obtained 33 g. of product which was recrystallized from 150 ml. of nitrobenzene to obtain 28.6 g. of yellow crystals melting at 200–201.5° C. The empirical formula of 2,4,4'-trihydroxybenzophenone is $C_{13}H_{10}O_4$, the carbon and hydrogen content being C=67.82% and H=4.35%. The present product was found to contain C=67.6% and H=4.39%.

Although the invention has been described in considerable detail with reference to certain preferred embodiments thereof, it will be understood that variations and modifications can be effected within the spirit and scope of the invention as described hereinabove and as defined in the appended claims.

We claim:

1. A polyethylene composition containing dispersed therein 0.1% to 10% by weight of 2,4,4'-trihydroxybenzophenone as an agent to inhibit deterioration of said polyethylene composition by ultraviolet light.

2. A polyethylene composition containing dispersed therein 0.5% to 5% by weight of 2,4,4'-trihydroxybenzophenone as an agent to inhibit deterioration of said polyethylene composition by ultraviolet light.

3. A polyethylene composition containing dispersed therein about 1% by weight of 2,4,4'-trihydroxybenzophenone as an agent to inhibit deterioration of said polyethylene composition by ultraviolet light.

References Cited in the file of this patent

Knowles et al.: J. Am. Oil Chemists Soc., 32, 158–160 (1955). (Copy in Div. 63.)

"Uvinul," C and E News, Oct. 14, 1957, page 131. (Copy in Library.)